(12) United States Patent
Modak et al.

(10) Patent No.: US 12,274,207 B2
(45) Date of Patent: Apr. 15, 2025

(54) PICKUP REEL WITH DIFFERENTIAL SPEED BAT TUBES

(71) Applicant: DEERE & COMPANY, Moline, IL (US)

(72) Inventors: Shreyas P. Modak, Thane (IN); Aditya Patil, Kolhapur (IN); Bryan R. Yanke, Eldridge, IA (US); Cristiano Engelmann, Horizontina (BR); Sam West, Coal Valley, IL (US); Richard A. Snell, Jr., East Moline, IL (US); Jesus Carlos Tinoco, San Pedro Garza Garcia (MX)

(73) Assignee: Deere & Company, Moline, IL (US)

( * ) Notice: Subject to any disclaimer, the term of this patent is extended or adjusted under 35 U.S.C. 154(b) by 670 days.

(21) Appl. No.: 17/496,850

(22) Filed: Oct. 8, 2021

(65) Prior Publication Data

US 2022/0151153 A1    May 19, 2022

Related U.S. Application Data

(60) Provisional application No. 63/115,693, filed on Nov. 19, 2020.

(51) Int. Cl.
*A01D 57/03* (2006.01)
*A01D 57/04* (2006.01)
*A01D 57/12* (2006.01)

(52) U.S. Cl.
CPC ............ *A01D 57/03* (2013.01); *A01D 57/04* (2013.01); *A01D 57/12* (2013.01)

(58) Field of Classification Search
CPC ........ A01D 57/02; A01D 57/03; A01D 57/04; A01D 57/12; A01D 41/14; A01D 84/00;
(Continued)

(56) References Cited

U.S. PATENT DOCUMENTS

| 1,996,294 A | 4/1935 | Hume et al. |
| 3,651,624 A * | 3/1972 | Bandemer ............... A01D 46/08 56/36 |

(Continued)

FOREIGN PATENT DOCUMENTS

CA    1311363 C    12/1992

OTHER PUBLICATIONS

MacDon FlexDraper—Model FD75—Headers, https://www.agriculture-xprt.com/products/macdon-flexdraper-model-fd75-headers-294019, publicly available as early as Oct. 8, 2021.
(Continued)

*Primary Examiner* — Thomas B Will
*Assistant Examiner* — Robert E Pezzuto
(74) *Attorney, Agent, or Firm* — Taft Stettinius & Hollister LLP; Stephen F. Rost

(57) ABSTRACT

A pickup reel assembly that includes a hub and multiple bat assemblies where each bat assembly rotates through a functional area where it moves crop material into a harvester, and a non-functional area where it does not move crop material into the harvester. Each bat assembly rotates at a first speed through the functional area and at a second speed through the non-functional area, where the second speed is greater than the first speed. A nominal speed shaft can rotate at the first speed, and an increased speed shaft can rotate at the second speed. Cogs can couple the bat assembly to the increased speed shaft when it is in the non-functional area. The cogs can also couple the bat assembly to the nominal speed shaft when it is in the functional area.

20 Claims, 12 Drawing Sheets

(58) Field of Classification Search
CPC ... A01D 89/002; A01D 89/003; A01D 89/005
See application file for complete search history.

(56) References Cited

U.S. PATENT DOCUMENTS

| | | | |
|---|---|---|---|
| 5,595,053 A | 1/1997 | Jasper et al. | |
| 5,768,870 A * | 6/1998 | Talbot | A01D 57/03 |
| | | | 56/220 |
| 2014/0325952 A1* | 11/2014 | Herringshaw | A01D 57/02 |
| | | | 56/227 |
| 2017/0055450 A1* | 3/2017 | Jasper | A01D 57/02 |

OTHER PUBLICATIONS

CLAAS Convio Draper Front Launch and Walkaround @ AgQuip 2018, https://www.youtube.com/watch?v=21H4g_XfyVg, publicly available as early as 2018.

2013 John Deere 635FD Flex Draper Head, https://www.purplewave.com/auction/180213/item/DC2389/2013-John_Deere-635FD-Harvesters-Platform_or_Stripper_Head-Kansas, publicly available as early as Feb. 13, 2018.

\* cited by examiner

PICKUP REEL WITH DIFFERENTIAL SPEED BAT TUBES

RELATED APPLICATIONS

This application is a non-provisional of U.S. Provisional Patent Application Ser. No. 63/115,693, filed Nov. 19, 2020, the disclosure of which is hereby incorporated by reference in its entirety.

FIELD OF THE DISCLOSURE

The present disclosure relates to harvester heads, and more specifically relates to pickup reel assemblies in harvester heads.

BACKGROUND

An important component of a harvester header is the pickup reel assembly which rotates in the front of the header to move cut crop material into the header for processing. The pickup reel assembly includes a plurality of bat tubes and bat support arms (bat assemblies) that rotate at a uniform speed and move the cut crop material into the header. However, the bat assemblies are only functional during the lower portion of their rotation when they are actually engaging the crop material and moving it into the header. During the upper portion of their rotation, the bat assemblies are not engaging the crop material or moving it into the header. There is cost and weight associated with each of the bat assemblies of the pickup reel assembly. In addition, during the upper non-functional portion of their rotation, the bat assemblies may interfere with an operator's visibility of the harvest and the front of the header.

It would be desirable to have an improved pickup reel assembly with fewer bat assemblies, bat tubes and bat support arms, that achieves the same functionality during the functional lower portion of the bat assembly rotation.

SUMMARY

A pickup reel assembly is disclosed that moves crop material into a harvester. The pickup reel assembly includes a hub and multiple bat assemblies. The hub rotates about a rotational axis. Each of the bat assemblies includes left and right bat tube support arms and a bat tube, where the proximal ends of bat tube support arms are coupled to the hub and the distal ends of the bat tube support arms are coupled to opposite ends of the bat tube. Each bat assembly rotates through a functional area where the bat assembly is positioned to move crop material into the harvester, and a non-functional area where the bat assembly is not positioned to move crop material into the harvester. Each bat assembly rotates at a first speed through the functional area and rotates at a second speed through the non-functional area, where the second speed is greater than the first speed. The pickup reel assembly can also include a plurality of fingers attached to the bat tube of the bat assembly.

The pickup reel assembly can also include a nominal speed shaft that rotates about the rotational axis at the first speed, and an increased speed shaft that rotates about the rotational axis at the second speed. When a bat assembly rotates through the non-functional area, the pickup reel assembly couples the bat assembly to the increased speed shaft. When the bat assembly rotates through the functional area, the pickup reel assembly decouples the bat assembly from the increased speed shaft. The pickup reel assembly can also include a guide ring fixedly coupled to the hub, and a support ring; where the proximal end of each of the bat assemblies is coupled to the guide ring, and the distal end of each of the bat assemblies is coupled to the support ring, and the proximal end of each of the bat assemblies is movable along the guide ring, and the distal end of each of the bat assemblies is movable along the support ring. Each bat tube support arm can include a retention mechanism that holds the bat tube support arm in the guide ring while allowing the proximal end of the bat tube support arm to move along the guide ring.

The pickup reel assembly can also include cogs, where each cog is associated with a bat assembly. When the associated bat assembly rotates through the non-functional area, the associated cog can couple to the increased speed shaft and rotate the associated bat assembly through the non-functional area at the second speed, and when the associated bat assembly rotates through the functional area, the associated cog can decouple from the increased speed shaft and rotate the associated bat assembly through the functional area at the first speed.

Each of the cogs can include a control arm, and the guide ring can include slots, such that when the associated bat assembly rotates through the functional area, the control arm of the cog can engage a guide ring slot and couple the cog to the nominal speed shaft; and when the associated bat assembly rotates through the non-functional area, the control arm of the cog can disengage the cog from the guide ring and allow the associated bat assembly to engage the increased speed shaft. Each of the cogs can also include an engagement face, such that when the associated bat assembly rotates through the functional area, the engagement face of the cog can decouple the cog from the increased speed shaft; and when the associated bat assembly rotates through the non-functional area, the engagement face of the cog can couple the cog with the increased speed shaft.

The guide ring can include slots, and each cog can also include an internal spring that pushes the cog laterally. When the associated bat assembly rotates through the functional area, the internal spring can push the control arm of the cog to engage in a guide ring slot and couple the cog to the nominal speed shaft. When the associated bat assembly rotates through the non-functional area, the engagement face can compress the internal spring of the cog and disengage the control arm from the guide ring and allow the associated bat assembly to engage the increased speed shaft.

The pickup reel assembly can also include an increased speed disc and a stationary control surface. The increased speed disc can be attached to the increased speed shaft and rotate about the rotational axis at the second speed. Each of the cogs can also include a first engagement face that faces the stationary control surface and a second engagement face that faces the increased speed disc. When the associated bat assembly rotates through the non-functional area, the stationary control surface can engage the first engagement face of the cog and press the second engagement face of the cog against the increased speed disc. When the associated bat assembly rotates through the functional area, the stationary control surface can not engage the first engagement face of the cog and allow the second engagement face of the cog to separate from the increased speed disc through the functional area.

Each of the cogs can include a control arm, and the guide ring can include slots. When the associated bat assembly rotates through the functional area, the control arm of the cog can engage in a guide ring slot and couple the associated cog to the nominal speed shaft. When the associated bat assembly rotates through the non-functional area, the control arm of the cog can disengage the cog from the guide ring and allow the associated bat assembly to engage the increased speed disc through the non-functional area.

Each of the cogs can also include an internal spring that pushes the cog laterally. When the associated bat assembly rotates through the functional area, the internal spring can push the control arm of the cog to engage in the guide ring slot and couple the cog to the nominal speed shaft through the functional area. When the associated bat assembly rotates through the non-functional area, the stationary control surface can compress the internal spring and disengage the control arm of the cog from the guide ring and allow the associated bat assembly to engage the increased speed disc through the non-functional area. The first engagement face of each of the cogs can include pins that rotate; and when the associated bat assembly rotates through the non-functional area, the pins on the first engagement face of the cog can rotate on the stationary control surface. The stationary control surface can include a leading member that includes multiple rollers, such that when the associated bat assembly first engages the stationary control surface the rollers of the leading member accelerate the cog of the associated bat assembly from the first speed to an accelerated speed greater than the first speed and less than the second speed.

The pickup reel assembly can also include an increased speed disc that is attached to the increased speed shaft, and that rotates about the rotational axis at the second speed, such that when the associated bat assembly rotates through the non-functional area, the cog can engage the increased speed disc to rotate the associated bat assembly through the non-functional area at the second speed. The pickup reel assembly can also include a nominal speed disc that is attached to the nominal speed shaft, and that rotates about the rotational axis at the first speed, such that when the associated bat assembly rotates through the functional area, the cog engages the nominal speed disc to rotate the associated bat assembly through the functional area at the first speed. Each of the cogs can be a toggle cog that can toggle between a first position and a second position. When the associated bat assembly enters the functional area, the toggle cog can toggle to the first position to engage the nominal speed disc, and when the associated bat assembly enters the non-functional area, the toggle cog can toggle to the second position to engage the increased speed disc. Each of the cogs can be attached to one of the left and right bat tube support arms of the associated bat assembly, and the bat tube support arm can be positioned between the nominal speed disc and the increased speed disc. When the associated bat assembly enters the functional area, the toggle cog can toggle in a first direction to engage the nominal speed disc and release the increased speed disc. When the associated bat assembly enters the non-functional area, the toggle cog can toggle in a second direction to engage the increased speed disc and release the nominal speed disc, where the second direction is opposite to the first direction.

The pickup reel assembly can also include an increased speed disc attached to the increased speed shaft, where the increased speed disc rotates about the rotational axis at the second speed. Each of the cogs can include an engagement surface, such that when the associated bat assembly rotates through the non-functional area, the engagement surface of the cog is moved inward to couple the associated cog to the increased speed shaft; and when the associated bat assembly rotates through the functional area, the engagement surface of the cog is moved outward to decouple the cog from the increased speed shaft through the functional area. The pickup reel assembly can also include a guide surface, and each of the cogs can include a guide connector. The guide connector of each of the cogs can follow the guide surface to move the engagement surface of the cog inward and outward as the associated bat assembly rotates through the functional and non-functional areas.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
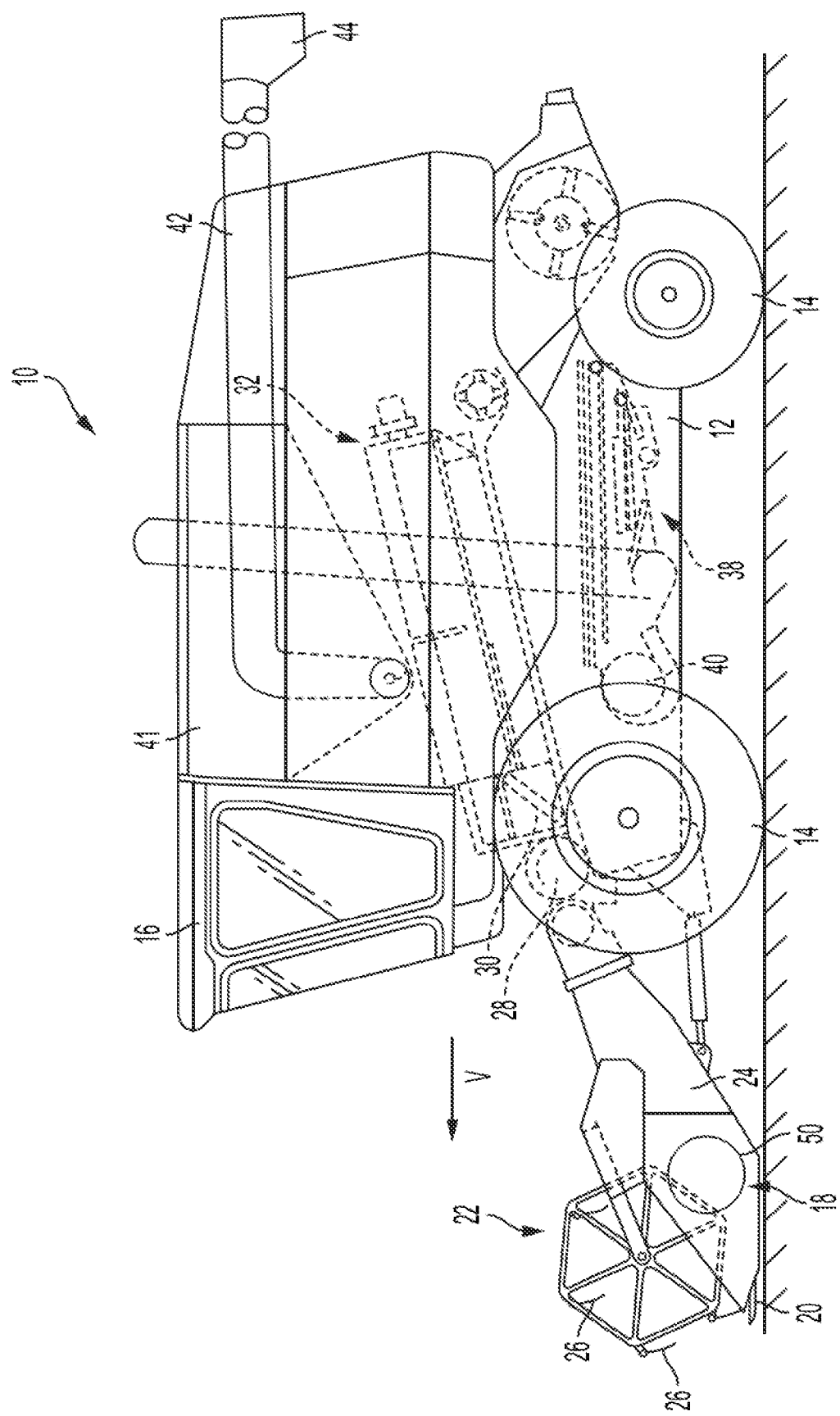
FIG. 1 illustrates an embodiment of an agricultural combine harvester with a header.

FIG. 1 illustrates an embodiment of an agricultural combine harvester 10 including a chassis 12 with wheels 14 in contact with the ground. Wheels 14 are coupled to the chassis 12 and are used for moving the combine 10 in a forward operating or travelling direction indicated by the arrow "V". In the text which follows, directional information such as "front" and "rear" relates to the direction of travel "V" of the combine harvester 10 during a harvesting operation, and "right" and "left" relate to an operator's right and left when facing in the direction of travel "V" of the combine harvester 10. The direction of travel "V" runs to the left in FIG. 1. The operation of the combine 10 is controlled from an operator's cab 16. The operator's cab 16 includes one or more controls for controlling the operation of the harvester 10. A draper header 18 is disposed at a forward end of the harvester 10 and includes a cutting knife or cutterbar 20 to cut crop being harvested. The cut crop includes any variety and types of different crops including wheat, soybeans, sorghum, barley, and other grains. At substantially the same time the grain is cut, a pickup reel assembly 22, rotates as understood by those skilled in the art, to move or force the cut crop toward a transverse auger 50 and a slope conveyor 24. The pickup reel assembly 22 includes a plurality of fingers 26. The fingers 26 lift and move the cut crop over the cutterbar 20, as well as comb through the cut crop to provide a degree of separation of the crop as it enters the auger 50. The cut crop is conducted by the slope conveyor 24 to a guide drum 28 and an inlet transition section 30. The inlet transition section 30 directs the cut crop to an axial harvested crop processing arrangement 32.

The crop processing arrangement 32 includes, in one or more embodiments, a rotor housing, a rotor including a hollow drum, a charging section, a threshing section, and a separating section, as is understood by those skilled in the art. A conveyor receives grain from the crop processing arrangement 32 and moves the grain to an outlet of the conveyor where it is deposited in a collection vehicle, such as a grain wagon. Grain and chaff that fall through the crop processing arrangement may be directed to a cleaning system 38 with a blower 40. The cleaning system 38 removes the chaff and guides the clean grain to an elevator for clean grain. The elevator deposits the clean grain in a tank 41 that is unloaded by a conveyor 42 having an outlet 44 to a wagon, trailer, or truck.

Figure 2:
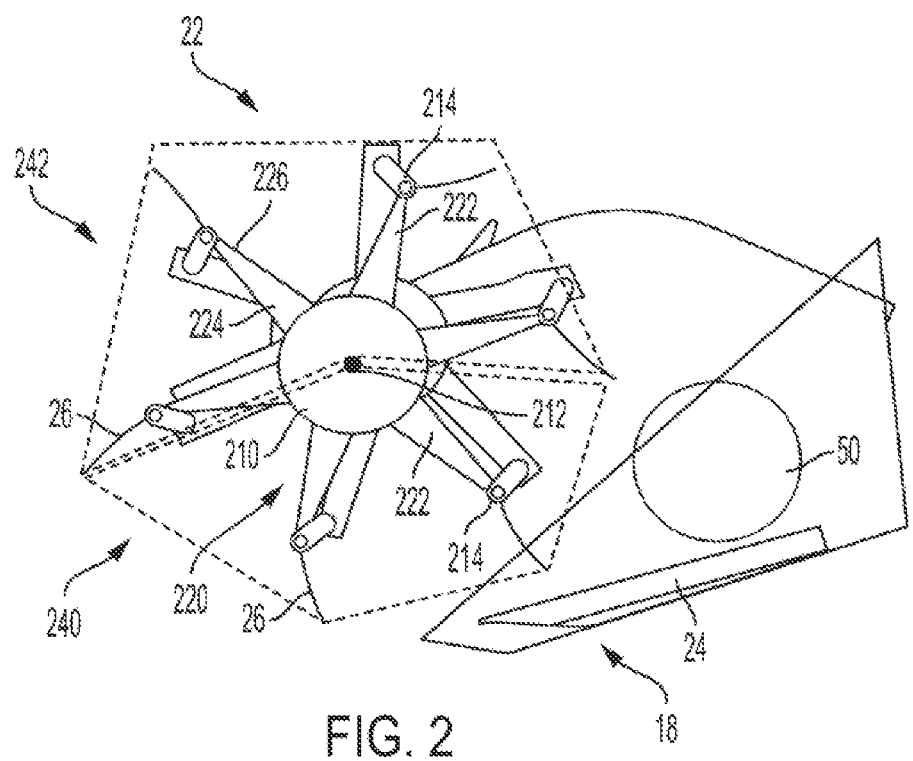
FIG. 2 illustrates a cross section of the typical pickup reel assembly and the front of the header where the bat assemblies rotate at a uniform speed.

FIG. 2 illustrates a cross section of the typical pickup reel assembly 22 and the front of the header 18. The pickup reel assembly 22 includes a hub 210 and a plurality of bat assemblies 220. Each of the plurality of bat assemblies 220 includes right and left bat support arms 222, a bat tube 214 and a plurality of fingers 26. The hub 210 rotates about a rotational axis 212 that is perpendicular to the plane of the paper. Each of the bat support arms 222 has a proximal end 224 coupled to the hub 210 and a distal end 226 away from the hub 210 that is coupled to the bat tube 214. The bat tubes 214 of the plurality of bat assemblies 220 are generally parallel to the hub 210 and the rotational axis 212. Each of the plurality of fingers 26 is attached to one of the plurality of bat tubes 214 and/or the distal end 226 of one of the plurality of bat support arms 222.

As shown in FIG. 2, the pickup reel assembly 22 rotates in the counterclockwise direction. As the crop is cut at the front of the header 18, the pickup reel assembly 22 rotates and moves the cut crop into the header 18 to be picked up by the slope conveyor 24 for processing. In FIG. 2, the generally circular path traced by the rotation of the pickup reel assembly 22 is divided into a functional area 240 and a non-functional area 242. As the bat assemblies 220 rotate through the functional area 240, they are moving the cut crop into the header 18 for processing. As the bat assemblies 220 rotate through the non-functional area 242, they are not moving the cut crop into the header 18, but are simply coming back around to re-enter the functional area 240. The bat assemblies 220 rotate at the same rate of speed whether they are in the functional area 240 contributing to the harvest, or in the non-functional area 242 not contributing to the harvest. Thus for the exemplary six-bat assembly pickup reel assembly 22 shown in FIG. 2, at any point in time two or more of the bat assemblies 220 are in the non-functional area 242.

Figure 3:
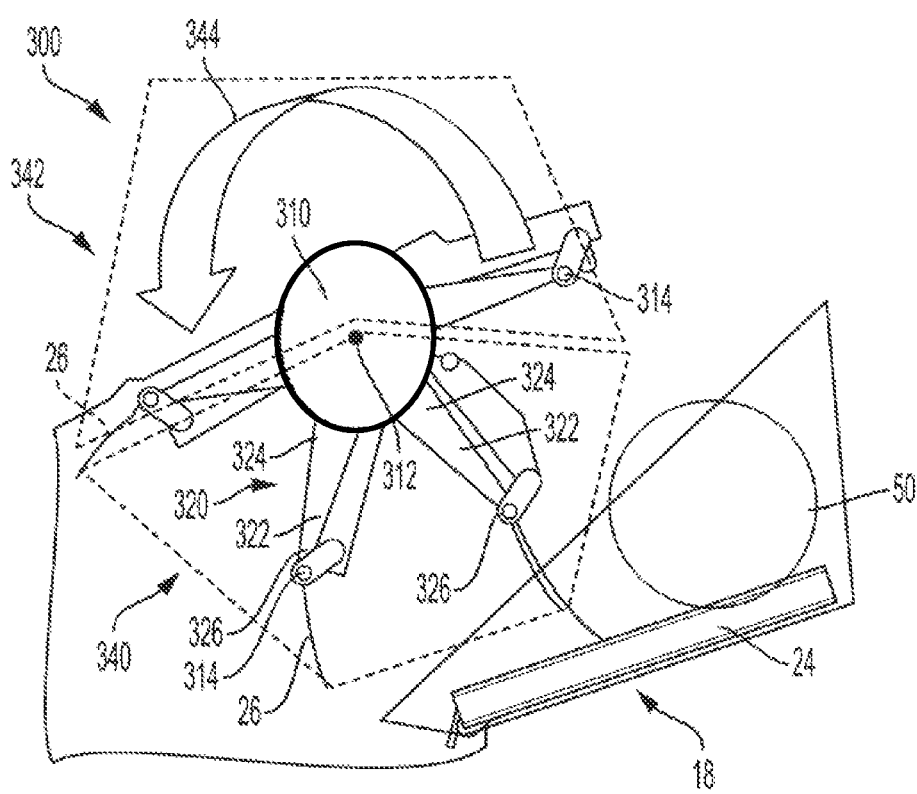
FIG. 3 illustrates a cross section of an improved pickup reel assembly and the front of the header where the bat assemblies rotate at differential speeds.

FIG. 3 illustrates a cross section of an improved pickup reel assembly 300 at the front of the header 18. The improved pickup reel assembly 300 includes a hub 310 and a plurality of bat assemblies 320. Each of the plurality of bat assemblies 320 includes right and left bat support arms 322, a bat tube 314 and a plurality of fingers 26. The hub 310 rotates around a rotational axis 312 that is perpendicular to the plane of the paper. Each of the bat support arms 322 includes a proximal end 324 adjacent to the hub 310, and a distal end 326 away from the hub 310 that is coupled to the bat tube 314. The distal end 326 of the left bat support arm 322 is coupled at or near the left end of the bat tube 314, and the distal end 326 of the right bat support arm 322 is coupled at or near the right end of the bat tube 314. The bat tubes 314 of the plurality of bat assemblies 320 are generally parallel to the hub 310 and the rotational axis 312. Each of the plurality of fingers 26 is attached to one of the plurality of bat tubes 314 and/or the distal end 326 of one of the plurality of bat support arms 322.

As shown in FIG. 3, the pickup reel assembly 300 rotates in the counterclockwise direction. As the crop is cut at the front of the header 18, the pickup reel assembly 300 rotates and moves the cut crop into the header 18 to be picked up by the slope conveyor 24 for processing. In FIG. 3, the generally circular path traced by the rotation of the pickup reel assembly 300 is divided into a functional area 340 and a non-functional area 342. As the bat assemblies 320 rotate through the functional area 340 they are moving the cut crop into the header 18 for processing. As the bat assemblies 320 rotate through the non-functional area 342 they are not moving the cut crop into the header 18, but are simply coming back around to re-enter the functional area 340.

However unlike the typical pickup reel assembly 22 of FIG. 2, the bat assemblies 320 of the improved pickup reel assembly 300 rotate at an increased speed in the non-functional area 342. For example, the bat assemblies 320 can rotate at N rotations per minute in the functional area 340 while contributing to the harvest, and at 3×N or 4×N rotations per minute indicated by arrow 344 in the non-functional area 342 while not contributing to the harvest. This increased speed of the bat assemblies 320 in the non-functional area 342 enables the exemplary improved pickup reel assembly 300 shown in FIG. 3 to have less bat assemblies 320, which includes fewer bat support arms 322, bat tube(s) 314 and fingers 26. In an example embodiment of the improved pickup reel assembly 300 where the bat assemblies 320 rotate about three-times as fast in the non-functional area 342, the pickup reel assembly 300 only needs four bat assemblies 320 instead of six bat assemblies 320, for the bat assemblies 320 to make the same number of passes at the same frequency through the functional area 340.

The increased speed in the non-functional area versus the functional area can be customized as desired. For example, a typical 8-bat assembly pickup reel that rotates at the same speed in both the functional and non-functional areas could be replaced by a 6-bat assembly pickup reel where the bat assemblies rotate about three-times as fast in the non-functional area, or by a 5-bat assembly pickup reel where the bat assemblies rotate about four-times as fast in the non-functional area. As another example, a typical 5-bat assembly pickup reel that rotates at the same speed in both the functional and non-functional areas could be replaced by a 4-bat assembly pickup reel where the bat assemblies rotate about two-times as fast in the non-functional area, or by a 3-bat assembly pickup reel where the bat assemblies rotate about three-times as fast in the non-functional area. The increased speed in the non-functional area can be customized as needed to rotate the bat assemblies from the exit of the functional area back to the entrance of the functional area, so the bat assemblies rotate through the functional area at the proper frequency. The size of the functional and non-functional areas can also be customized as needed with minimal or no change to the function of the pickup reel assembly 300.

The improved pickup reel assemblies where the bat assemblies rotate at an increased speed in the non-functional area versus the functional area, enable the improved pickup reel assembly to have fewer bat support arms and bat tubes than an equivalent prior art pickup reel assembly without changing the effective diameter or the function of the pickup reel assembly. The bat assemblies in the functional area enable the improved pickup reel assembly to gather the crop material and put it on the auger or draper belts at the same speed, while the bat assemblies in the non-functional area rotate at an increased speed after their function is completed to return to the entry of the functional area where they return to their original speed to rotate through the functional area. This can reduce the cost and weight of the pickup reel assembly. This can also improve visibility by decreasing the time bat support arms and bat tubes are in the non-functional area where they can interfere with operator viewing of the front of the header 18.

Figure 4:
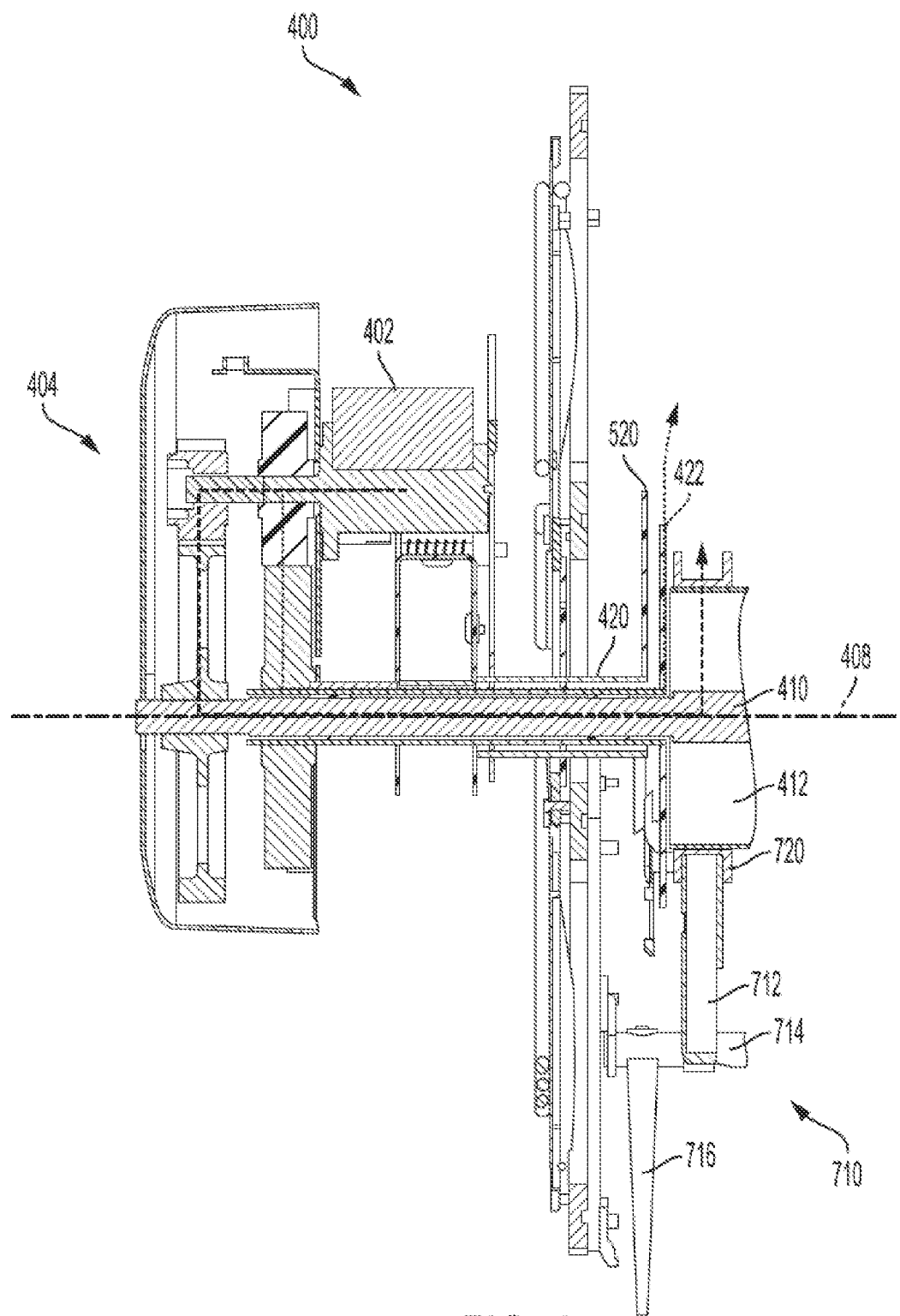
FIG. 4 illustrates a cross-section view of an exemplary driver mechanism for the improved pickup reel assembly where the bat assemblies rotate at differential speeds.
Figure 5:
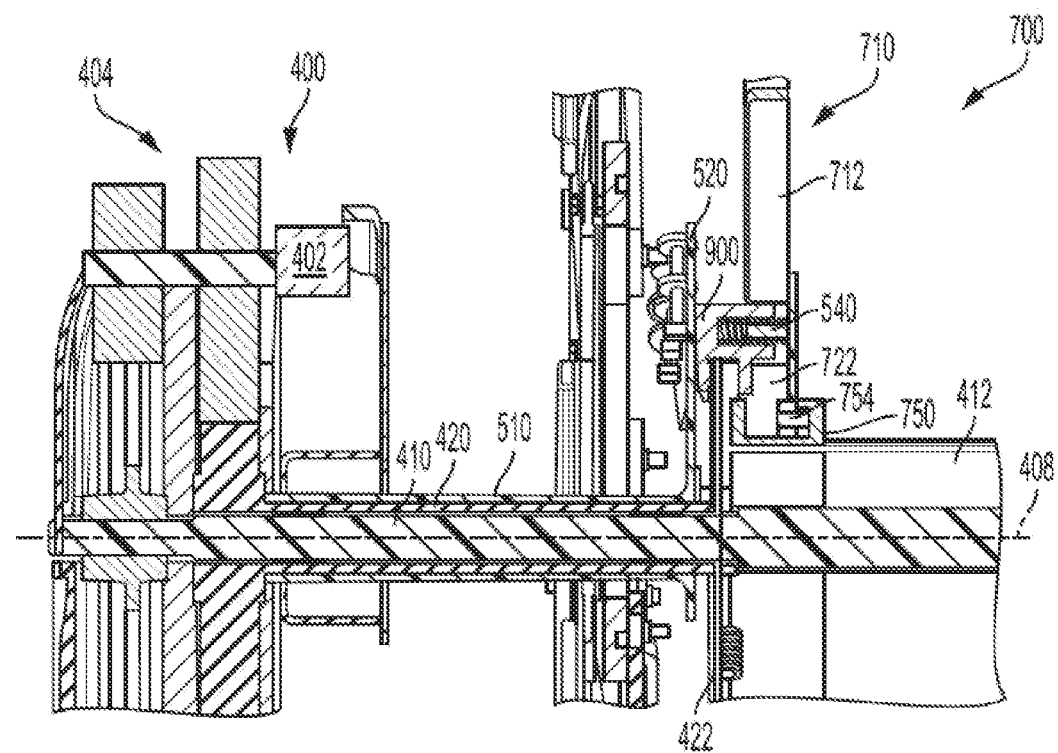
FIG. 5 illustrates a bat tube support arm of one of the bat assemblies with a spring-loaded cog in the non-functional area.
Figure 6:
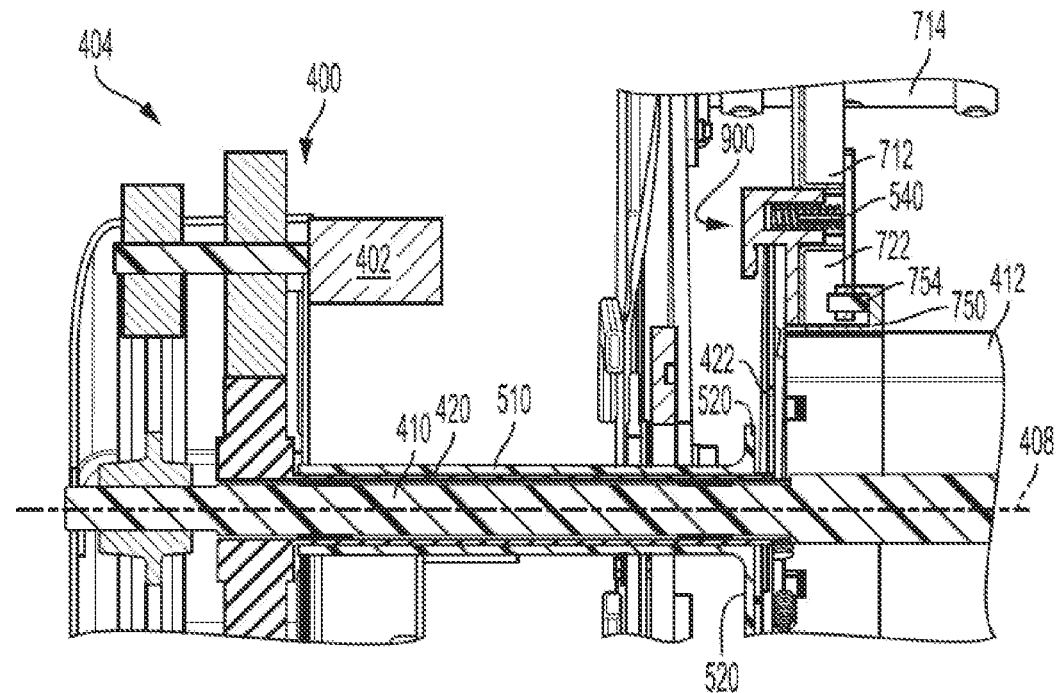
FIG. 6 illustrates a bat tube support arm of one of the bat assemblies with a spring-loaded cog in the functional area.

FIGS. 4-6 illustrate several views of an exemplary driver mechanism 400 for an improved pickup reel assembly that uses four bat assemblies to replace a traditional six bat assembly pickup reel. As explained above, the concepts described herein can be used to reduce the number bat assemblies for various size traditional bat assembly pickup reels, for example replacing a traditional eight bat assembly pickup reel with an improved pickup reel assembly that uses five or six bat assemblies, or replacing a traditional five bat assembly pickup reel with an improved pickup reel assembly that uses three or four bat assemblies, etc.

Figure 7:
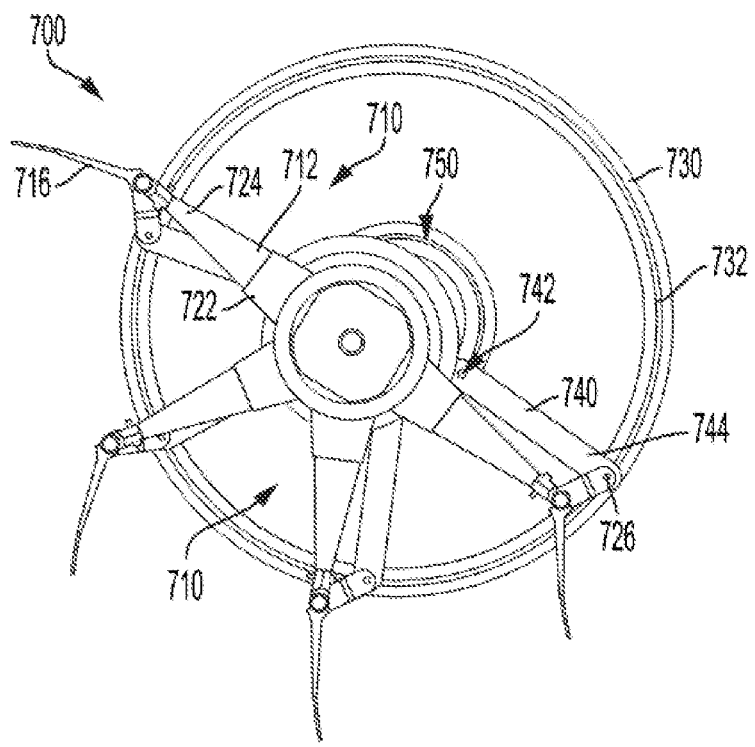
FIG. 7 illustrates an improved pickup reel assembly with four bat assemblies coupled to a guide ring and a support ring.
Figure 8:
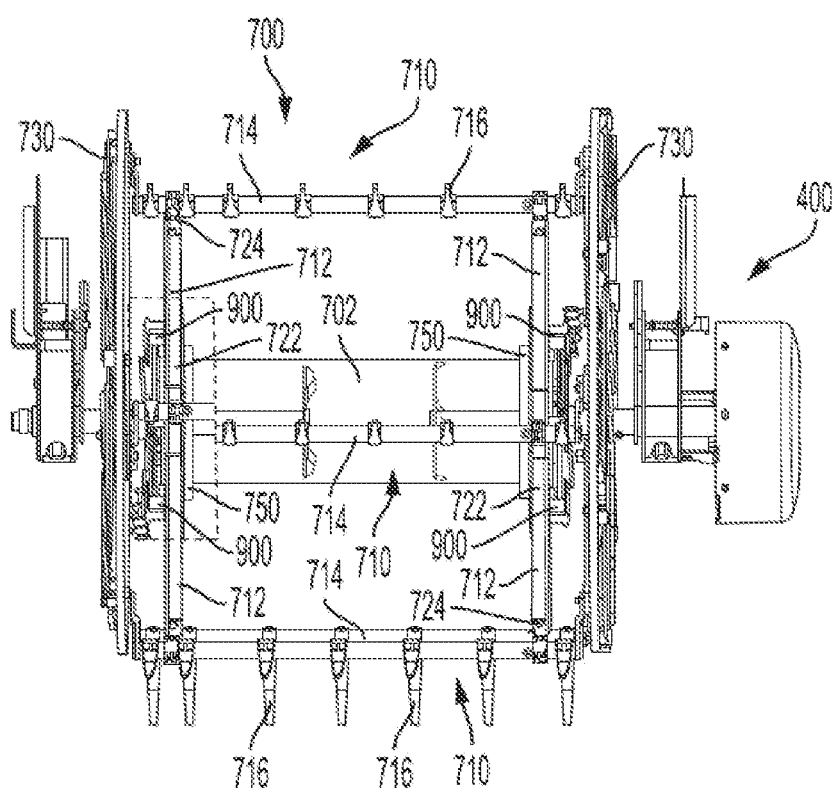
FIG. 8 illustrates a front view of the pickup reel assembly showing the bat tubes.
Figure 9:
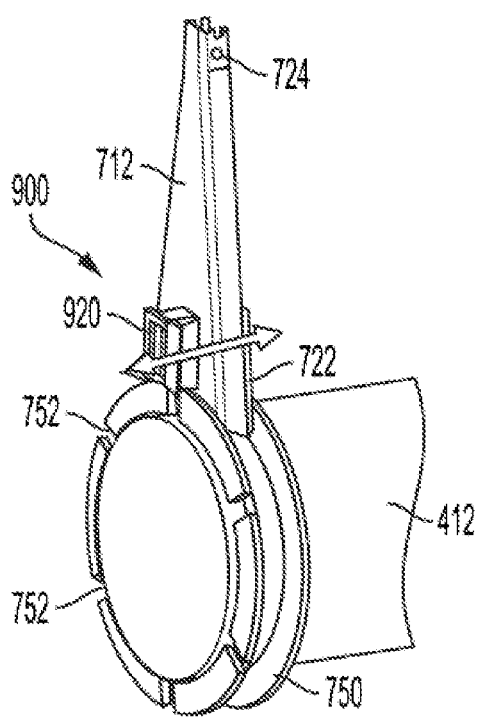
FIG. 9 illustrates a single bat support arm with its associated cog and the lateral movement of the cog into and out of guide ring slots.
Figure 10:
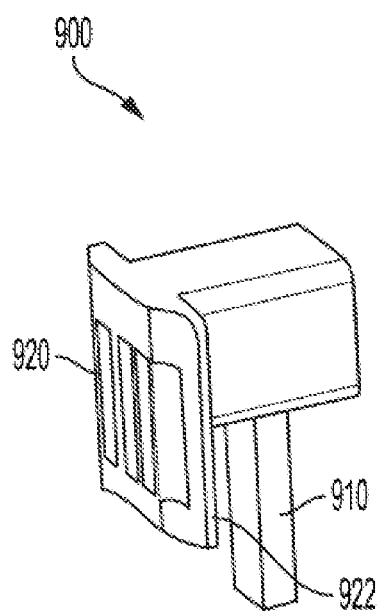
FIG. 10 illustrates a cog that can move in and out to cause its associated bat assembly to rotate at different speeds.

The improved pickup reel assembly 700 includes a center rotor 412 and a plurality of bat assemblies 710. The bat assemblies 710 rotate around different portions of the center rotor 412 at different speeds. FIG. 7 illustrates a side view of the pickup reel assembly 700 with four bat assemblies 710. Each of the plurality of bat assemblies 710 includes right and left bat tube support arms 712, a bat tube 714 and a plurality of fingers 716. FIG. 8 illustrates a front view of the pickup reel assembly 700 showing the bat tubes 714. Each of the bat tube support arms 712 includes a proximal end 722 adjacent to the center rotor 412, and a distal end 724 away from the center rotor 412 that is coupled to the bat tube 714. FIG. 9 illustrates a single bat support arm 712 and cog 900 with a guide ring 750, and shows the lateral movement of the cog 900 into and out of guide ring slots 752. FIG. 10 illustrates an exemplary cog 900 that can move in and out to cause the bat support arm 712 and associated bat assembly 710 to rotate at different speeds.

The driver mechanism 400 includes a power source or motor 402, a gearbox 404, a nominal speed shaft 410 and an increased speed shaft 420. The power source 402 provides power to the gearbox 404 which drives the two shafts 410, 420 to rotate about a rotational axis 408. The gearbox 404 drives the nominal speed shaft 410 at a nominal rotation speed for rotation of the bat assemblies 710 through the functional area 340, and drives the increased speed shaft 420 at a faster rotation speed for rotation of the bat assemblies 710 through the non-functional area 342. The nominal speed shaft 410 is attached to the center rotor 412 that rotates at the nominal rotation speed. The increased speed shaft 420 is attached to an increased speed disc 422 that rotates at the increased rotation speed. The driver mechanism 400 can also include a stationary control surface 520. A ball-bearing ring 510 can be positioned around the increased speed shaft 420 to separate the stationary control surface 520 from the increased speed shaft 420.

The improved pickup reel assembly 700 includes the bat assemblies 710, a guide ring 750 and a support ring 730. The guide ring 750 is fixedly attached to the center rotor 412, and the support ring 730 is located near the perimeter, distal end of the pickup reel assembly 700. The guide ring 750 includes a plurality of slots 752 (see FIG. 9). The number of guide ring slots 752 is usually equal to the number of bat assemblies that would be present in a traditional reel assembly, which for this exemplary embodiment is six. Each of the bat assemblies 710 is coupled to an associated linkage 740 with a proximal end 742 that is movable along the guide ring 750, and a distal end 744 that is movable along the support ring 730. As shown in FIGS. 5 and 6, the proximal ends 722 of the bat tube support arms 712 can include a retention mechanism 754. The retention mechanism 754 locks the proximal end 722 of its associated bat tube support arm 712 in the guide ring 750 while still allowing the proximal end 722 to slide within the guide ring 750. The proximal end 722 of the bat tube support arm 712 and the proximal end 742 of the associated linkage 740 move together along the guide ring 750. The distal ends 744 of the linkages 740 can include rollers 726 that roll along a track 732 in the support ring 730. The bat tube 714 is coupled to the distal ends 724 of the right and left bat tube support arms 712, and can be coupled to the support ring 730. The bat tube 714, the distal end 724 of the bat tube support arm 712 and the distal end 744 of the associated linkage 740 move together along the support ring 730. The fingers 716 can be attached to the bat tubes 714 and/or to the distal ends 724 of the bat tube support arms 712.

Each of the bat assemblies 710 also includes at least one cog. An exemplary cog 900, shown in FIG. 10, includes a control arm 910, an outer engagement face 920 and an inner engagement face 922. The cog 900 can be attached to the proximal ends 722 of one or both of the right and left bat tube support arms 712 of the associated bat assembly 710. The cog 900 can move back and forth, parallel to the rotational axis 408, to engage and disengage the increased speed disc 422 as the associated bat assembly 710 rotates through the non-functional area 342 and functional area 340, respectively. The outer engagement face 920 of the cog 900 can be configured to engage the stationary surface and an inner engagement face 922

As shown in FIGS. 5 and 6, some embodiments of the cog 900 can include an internal spring 540 which moves the cog 900 as the associated bat assembly 710 rotates through the non-functional area 342 and functional area 340. The functioning of exemplary embodiment shown in FIGS. 5 and 6 will now be described when using an embodiment of the cog 900 with an internal spring 540, a spring-loaded cog.

FIG. 5 illustrates a bat tube support arm 712 of one of the bat assemblies 710 in the non-functional area 342. When the bat tube support arm 712 enters the non-functional area 342, the outer engagement face 920 of the cog 900 engages the stationary control surface 520. The stationary control surface 520 can have a sloped leading edge to lessen of the impact of the cog 900 engaging the stationary control surface 520. The stationary control surface 520 pushes against the outer engagement face 920 of the spring-loaded cog 900 which compresses the internal spring 540 and pushes the cog 900 toward the increased speed disc 422. This movement of the cog 900 by the stationary control surface 520 initiates two actions that affect the rotation speed of the bat tube support arm 712 and its associated bat assembly 710 in the non-functional area 342. First, this movement of the spring-loaded cog 900 by the stationary control surface 520 pushes the control arm 910 of the cog 900 out of the slot 752 of the guide ring 750 that it was in while rotating through the functional area 340. Second, this movement of the spring-loaded cog 900 by the stationary control surface 520 pushes the inner engagement face 922 of the cog 900 against the increased speed disc 422. With the control arm 910 of the cog 900 free of the guide ring 750 (rotating at nominal speed) and the inner engagement face 922 of the cog 900 pressed against the increased speed disc 422 (rotating at increased speed), the cog 900 and its associated bat tube support arm 712 and bat assembly 710 will rotate through the non-functional area 342 at the increased speed of the increased speed disc 422.

FIG. 6 illustrates a bat tube support arm 712 of one of the bat assemblies 710 in the functional area 340. Note FIG. 6 shows the functional area 340 in the upper portion for easy comparison with FIG. 5 which shows the non-functional are 342 in the upper portion. When the bat tube support arm 712 enters the functional area 340, the outer engagement face 920 of the cog 900 comes off the trailing edge of the stationary control surface 520. Note the smaller radius of the stationary control surface 520 in the functional area 340 and the larger radius of the stationary control surface 520 in the non-functional area 342, so that the outer engagement face 920 of the cog 900 engages the stationary control surface 520 in the non-functional area 342 and does not engage the stationary control surface 520 in the functional area 340.

When the outer engagement face 920 of the spring-loaded cog 900 disengages the stationary control surface 520, the internal spring 540 of the cog 900 pushes the cog 900 away from the increased speed disc 422. This movement of the cog 900 by the internal spring 540 initiates two actions that affect the rotation speed of the bat tube support arm 712 and its associated bat assembly 710 in the functional area 340. First, this movement of the spring-loaded cog 900 by the by the internal spring 540 pushes the control arm 910 of the cog 900 against the guide ring 750 to slide into a slot 752 of the guide ring 750 that it will rotate in through the functional area 340. Second, this movement of the spring-loaded cog 900 by the internal spring 540 disengages the inner engagement face 922 of the cog 900 from the increased speed disc 422. With the control arm 910 of the cog 900 in a slot of the guide ring 750 (rotating at nominal speed) and the inner engagement face 922 of the cog 900 disengaged from the increased speed disc 422 (rotating at increased speed), the cog 900 and its associated bat tube support arm 712 and bat assembly 710 will rotate through the functional area 340 at the nominal speed of the guide ring 720 and hub 412.

A cog, for example the cog 900, can be attached to just one of the right and left support arms 712 of the bat assemblies 710. In these one-sided embodiments, the nominal speed shaft 410, the increased speed shaft 420, the increased speed disc 422 and the stationary control surface 520 are only needed on the side of the pickup reel assembly 700 with the cogs 900. In these one-sided embodiments, it is also not necessary to coordinate movement of cogs on different sides of the bat assembly 710.

As shown in FIG. 8, each of the right and left support arms 712 of each bat assembly 710 can include a cog, for example the cog 900. The nominal speed and increased speed shafts 410, 420 can extend through the center rotor 412, and a stationary control surface 520 and an increased speed disc 422 can be located on both the right and left sides of the pickup reel assembly 700. Then the cogs 900 on both the left and right sides of the bat assembly 710 can be configured to simultaneously move as described above. The left and right stationary control surfaces 520 can be positioned so that the cogs 900 on both sides of the bat assembly 710 virtually simultaneously disengage and engage the left and right stationary control surfaces 520 as the bat assembly 710 rotates through the functional area 340 and non-functional area 342, respectively. Having the right and left bat tube support arms 712 on the opposite ends of the bat tube 714 increase and decrease speed simultaneously helps reduce twisting of the bat assembly 710, bat tube 714 and pickup reel assembly 700.

The pickup reel assembly 700 with fewer bat assemblies 710 (including fewer bat support arms 712 and bat tubes 714), reduces the weight hanging on the front end of the header, and can reduce the cost of the pickup reel assembly 700. The pickup reel assembly 700 with fewer bat assemblies 710 may also increase visibility of the front of the header, especially since the bat assemblies 710 being eliminated would be in the upper, non-functional area of the pickup reel assembly 700. The pickup reel assembly 700 with fewer bat assemblies 710 does not impact the functionality of the pickup reel assembly 700 since the bat assemblies 710 rotate at substantially the same frequency and speed through the functional area where they are needed.

Figure 11:
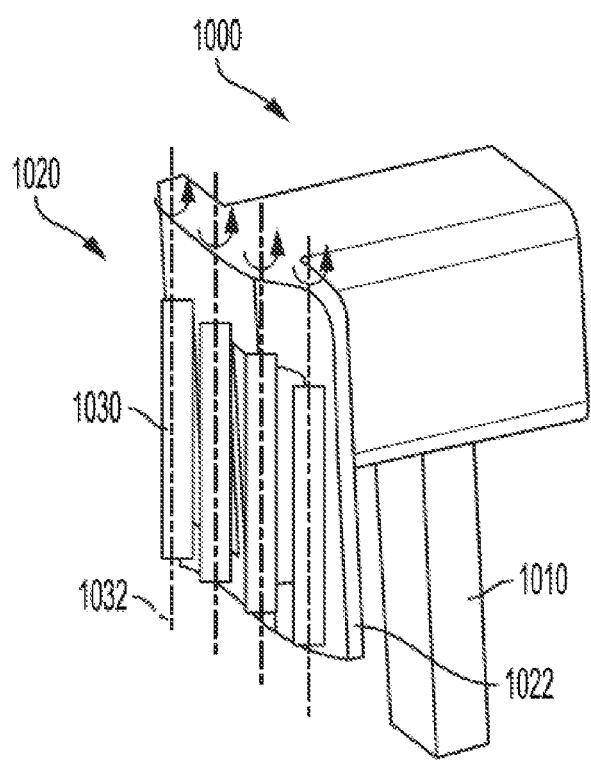
FIG. 11 illustrates an alternative embodiment of a cog that includes an engagement face with cylindrical grooves and cylindrical pins inserted into the grooves.
Figure 12:
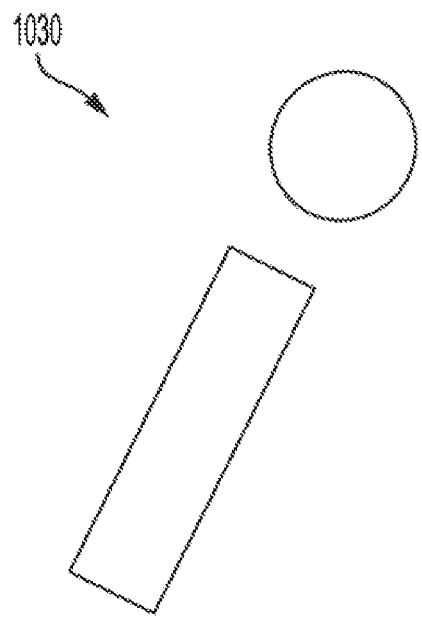
FIG. 12 illustrates an embodiment of the cylindrical pins.

FIGS. 11 and 12 illustrate another embodiment of a cog 1000 that includes a control arm 1010, an outer engagement face 1020 and an inner engagement face 1022. The cog 1000 can be used in place of the cog 900 with the pickup reel assembly 700 as described above, especially with regard to FIGS. 5 and 6. Cylindrical grooves can be cut into the outer engagement face 1020 and cylindrical pins 1030 can be inserted into the grooves. Each of the cylindrical pins 1030 can rotate about a pin rotation axis 1032. The cylindrical pins 1030 can act as a sliding and rotating friction member for the cogs 1000 as the outer engagement face 1020 is pressed against and rotates over the stationary control surface 520 while the cog 1000 and its associated bat assembly 710 rotates through the non-functional area 342. The cylindrical pins 1030 can act in similar fashion to the balls found inside some disk brakes. The outer engagement face 1020 of the cog 1000 can have a smooth high radius curved front face to engage and disengage the stationary control surface 520 more smoothly.

Figure 13:
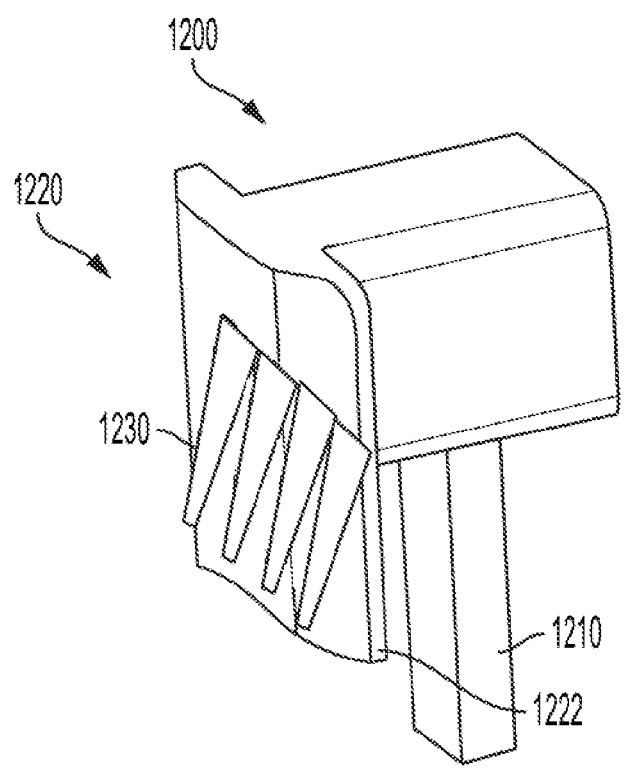
FIG. 13 illustrates an alternative embodiment of a cog that includes an engagement face with conical grooves and conical pins inserted into the grooves.
Figure 14:
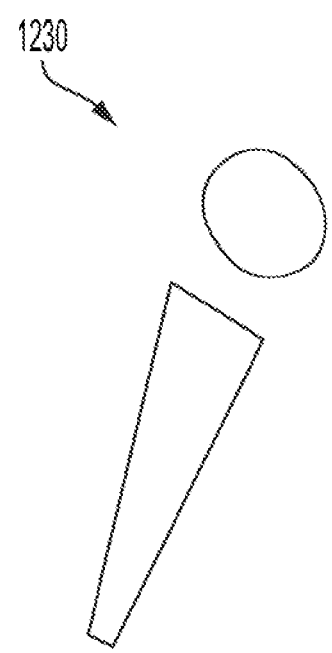
FIG. 14 illustrates an embodiment of the conical pins.

FIGS. 13 and 14 illustrate yet another embodiment of a cog 1200 that includes a control arm 1210, an outer engagement face 1220 and an inner engagement face 1222. The cog 1200 can also be used in place of the cog 900 with the pickup reel assembly 700 as described above, especially with regard to FIGS. 5 and 6. Conical grooves can be cut into the engagement face 1220 and conical pins 1230 inserted into the grooves where each conical pin 1230 can rotate about a rotation axis. The conical pins 1230 can act as a sliding and rotating friction member for the cogs 1200 as the outer engagement face 1220 is pressed against and rotates over the stationary control surface 520 while the cog 1200 and its associated bat assembly 710 rotates through the non-functional area 342. The outer engagement face 1220 of the cog 1200 can have a smooth high radius curved front face to engage and disengage the stationary control surface 520 more smoothly.

Figure 15:
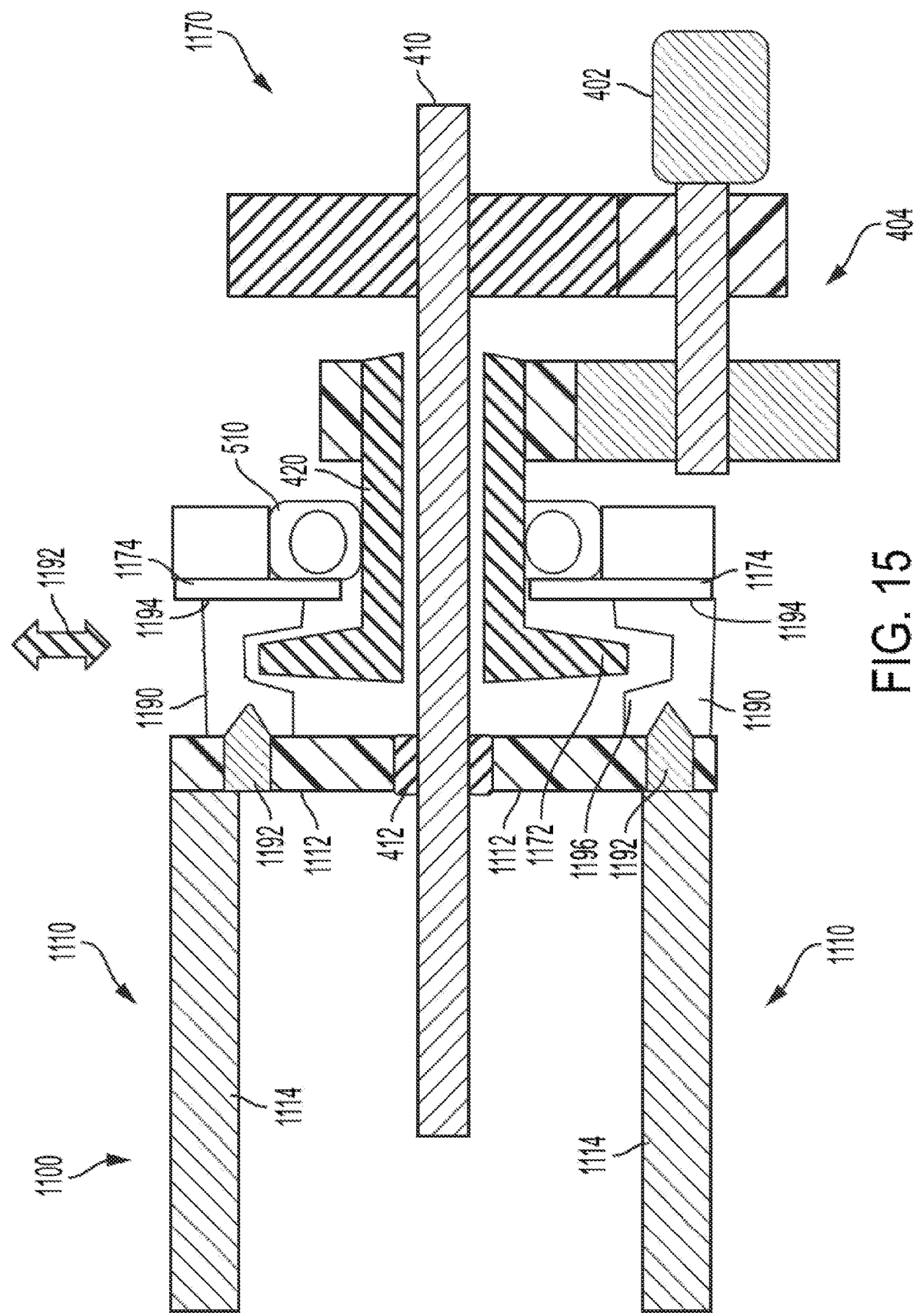
FIG. 15 illustrates a front view of a portion of an alternative improved pickup reel assembly with an alternative vertical cog.

FIG. 15 illustrates a front view of a portion of an alternative improved pickup reel assembly 1100 with an alternative vertical cog 1190. The improved pickup reel assembly 1100 includes an alternative driver mechanism 1170, similar to the driver mechanism 400 described above. The driver mechanism 1170 includes a power source or motor 402, a gearbox 404, a nominal speed shaft 410 and an increased speed shaft 420. The power source 402 provides power to the gearbox 404 which drives the two shafts 410, 420. The gearbox 404 drives the nominal speed shaft 410 at a nominal rotation speed for rotation of the bat assemblies through the functional area 340, and drives the increased speed shaft 420 at a faster rotation speed for rotation of the bat assemblies through the non-functional area 342. The nominal speed shaft 410 is attached to the center rotor 412 that rotates at the nominal rotation speed. The increased speed shaft 420 is attached to an increased speed disc 1172 that rotates at the increased rotation speed. The driver mechanism 1170 can also include a ball-bearing ring 510 and a guide surface 1174. The ball-bearing ring 510 can be positioned around the increased speed shaft 420, and separate the guide surface 1174 from the increased speed shaft 420. The pickup reel assembly 1100 includes a plurality of bat assemblies 1110 where each of the bat assemblies 1110 includes right and left bat tube support arms 1112, a bat tube 1114 and a plurality of fingers, similar to the bat assemblies 1110 described above. However, the bat assemblies 1110 are coupled to the alternative vertical cogs 1190.

The alternative vertical cogs 1190 can include an arm connector 1192, a guide connector 1194 and an engagement surface 1196. A vertical cog 1190 can be coupled to one or both of the right and left bat tube support arms 1112 of each bat assembly 1110. The arm connector 1192 of each vertical cog 1190 is configured to connect to one of the bat tube support arms 1112 of the associated bat assembly 1110. The vertical cogs 1190 are configured to move up-and-down as indicated by arrow 1192 as they rotate through the functional and non-functional areas 340, 342. The arm connector 1192 of each vertical cog 1190 can be configured to move up-and-down along its associated bat tube support arms 1112.

One exemplary method for causing the vertical cogs 1190 to move up-and-down during rotation of the bat assemblies 1110, is to have a guide path embedded in the guide surface 1174 which the guide connector 1194 of the vertical cog 1190 follows. The guide path embedded in the guide surface 1174 can be further away from the increased speed disc 1172 while the vertical cog 1190 and associated bat assembly 1110 pass through the functional area 340, and can be closer to the increased speed disc 1172 while the vertical cog 1190 and associated bat assembly 1110 pass through the non-functional area 342. When the bat assembly 1110 enters the functional area 340, the vertical cog 1190 connected to the support arm or arms 1112 of the bat assembly 1110 moves away from the increased speed disc 1172 so that the engagement face 1196 of the cog 1190 does not engage the increased speed disc 1172 (see lower cog 1190 of FIG. 11). The vertical cog 1190 stays separated from the increased speed disc 1172 while the bat assembly 1110 rotates through the functional area 340, so the bat assembly 1110 rotates at the nominal speed of the center rotor 412. When the bat assembly 1110 enters the non-functional area 342, the vertical cog 1190 connected to the support arm or arms 1112 of the bat assembly 1110 moves towards the increased speed disc 1172 and the engagement face 1196 of the cog 1190 engages the increased speed disc 1172 (see upper cog 1190 of FIG. 11). The vertical cog 1190 stays engaged with the increased speed disc 1172 during at least a portion of the rotation of the bat assembly 1110 through the non-functional area 342, so the bat assembly 1110 rotates at the increased speed of the increased speed disc 1172.

Figure 16:
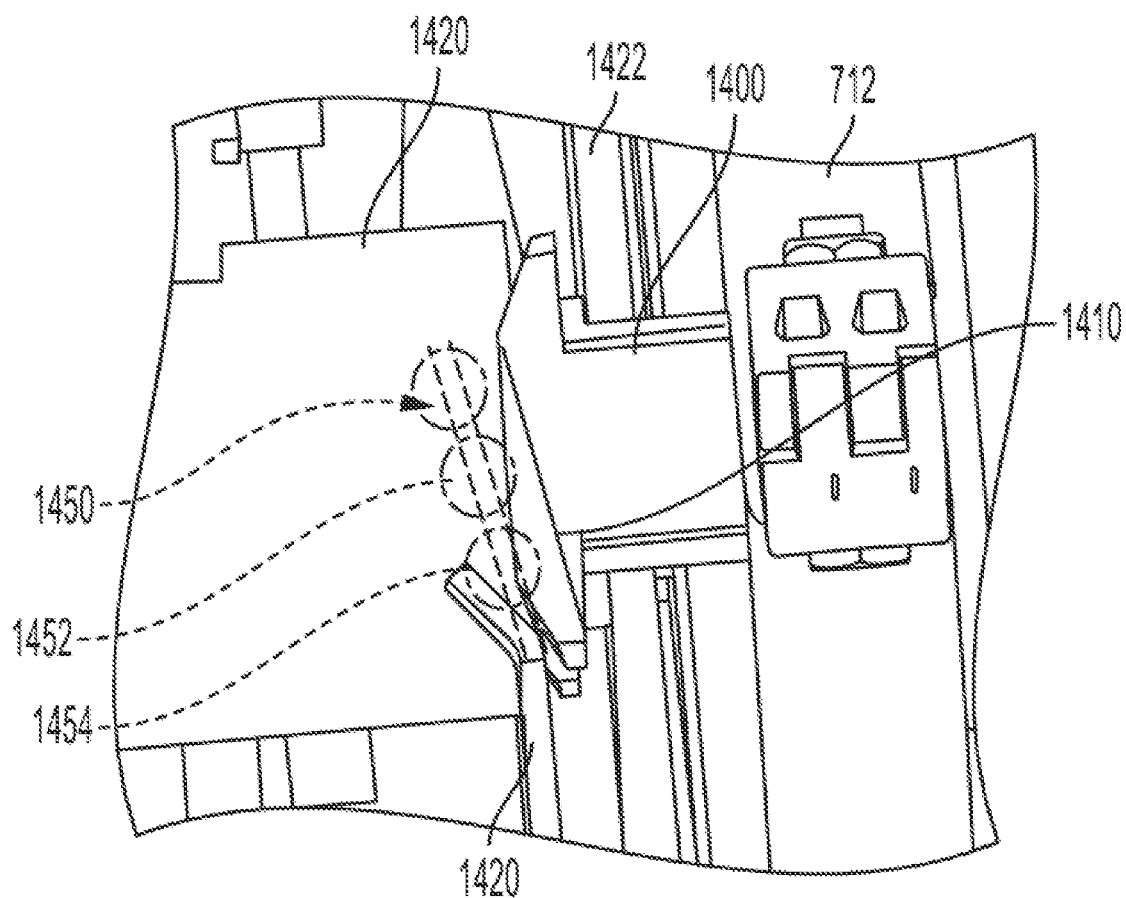
FIG. 16 illustrates an alternative embodiment of a stationary control surface that includes a leading member with rollers of incrementing speeds to speed up the cog before it comes in contact with the increased speed disc.

FIG. 16 illustrates an alternative embodiment of the stationary control surface 1420 which has a leading member 1440. The leading member 1440 of the stationary control surface 1420 includes a plurality of rollers 1450-1454 with incrementing speeds to speed up a cog 1400 as it enters the non-functional area 342 before it comes in contact with the increased speed disc 1422. The rollers 1450-1454 can be made of rubber or other material. The first roller 1450 can rotate at a first speed to increase the speed of the cog 1400 and its associated bat assembly 712 above the nominal speed of the center rotor 412. The second roller 1452 can rotate at a second speed, which is higher than the first speed, to further increase the speed of the cog 1400 and its associated bat assembly 712. The third roller 1454 can rotate at a third speed, which is higher than the second speed but slower than the increased speed disc 1422 to further increase the speed of the cog 1400 and its associated bat assembly 712. The incrementing speeds of the cog 1400 and its associated bat assembly 712 helps reduce the acceleration forces when they come in contact with the increased speed disc 1422. A single motor with a gear train can produce the multiple desired rotational speeds for the rollers 1450-1454.

Figure 17:
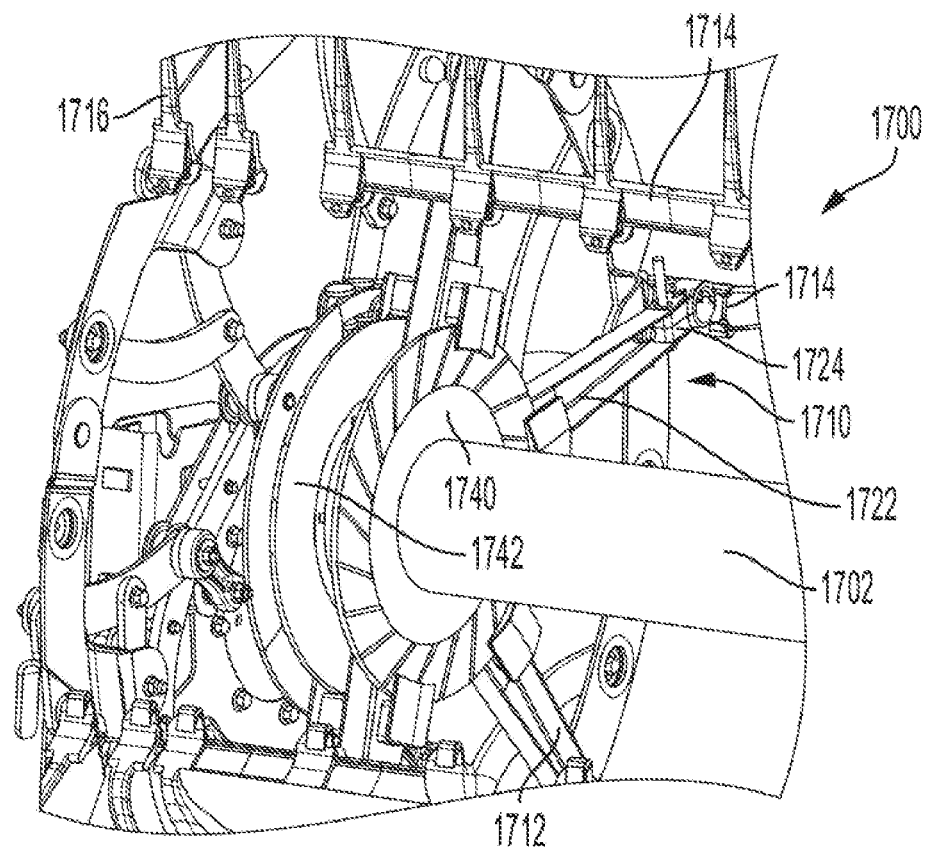
FIG. 17 illustrates one side of the pickup reel assembly that includes a nominal speed rotor and an increased speed rotor.

FIGS. 17-20 illustrate yet another embodiment of an improved pickup reel assembly 1700. FIG. 17 illustrates one side of the pickup reel assembly 1700 that includes a center shaft 1702, a nominal speed rotor 1740, an increased speed rotor 1742, a plurality of bat assemblies 1710, and a plurality of toggle cogs 1790. The bat assemblies 1710 rotate around different portions of the center shaft 1702 at different speeds depending on which of the rotors 1740, 1742 they are engaged with. Each of the plurality of bat assemblies 1710 includes bat tube support arms 1712, a bat tube 1714 and a plurality of fingers 1716. Each of the bat tube support arms 1712 includes a proximal end 1722 adjacent to the center rotor 1702, and a distal end 1724 away from the center rotor 1702 that is coupled to the bat tube 1714. Each of the bat tube support arms 1712 also has a toggle cog 1790 connected near the proximal end 1722.

Figure 18:
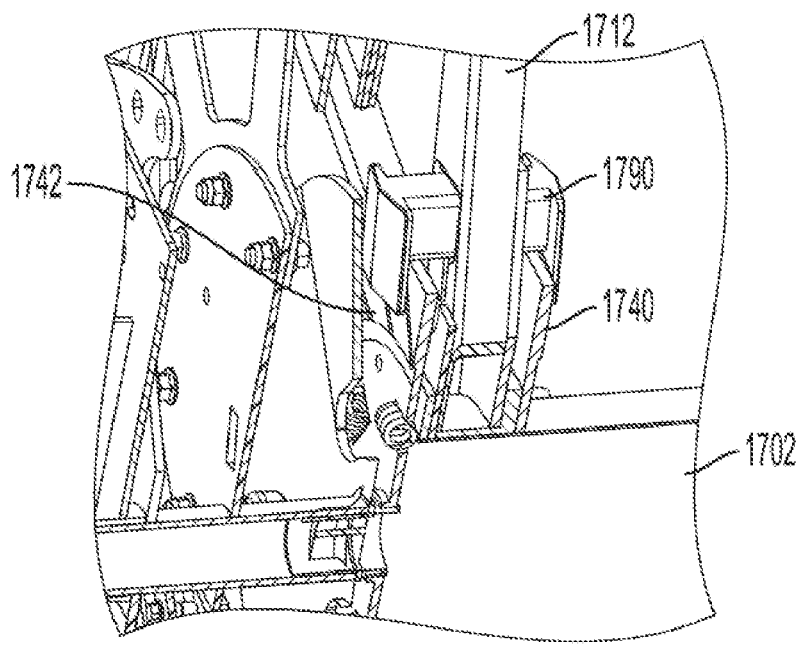
FIG. 18 illustrates a close up view of the proximal end of one of the bat support arms between the nominal speed rotor and the increased speed rotor where the bat support arm has a toggle cog.
Figure 19:
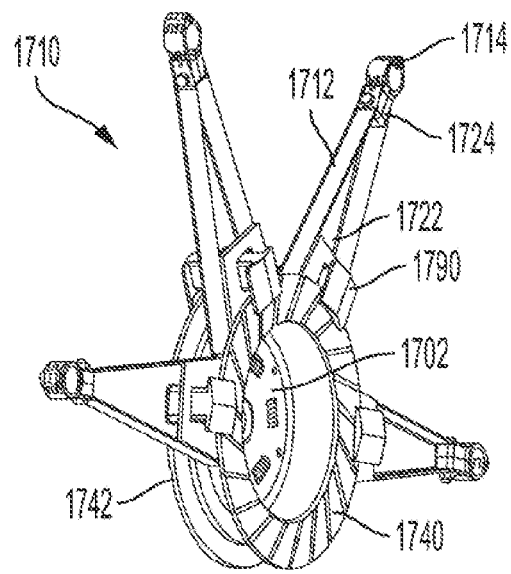
FIG. 19 illustrates a side view of the center shaft, the nominal and increased speed rotors and four bat tube support arms with associated toggle cogs.
Figure 20:
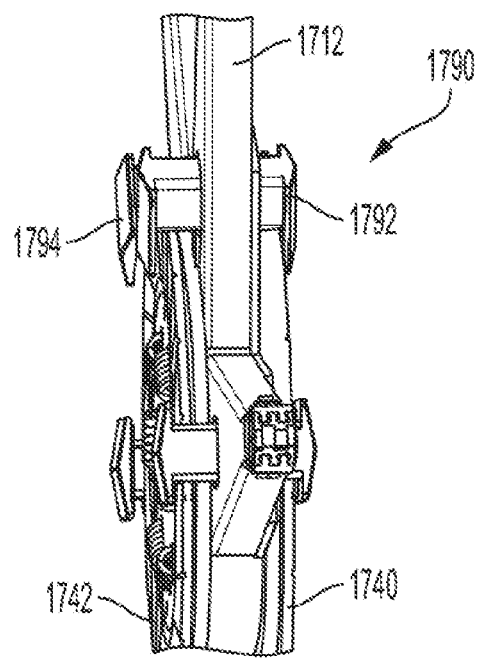
FIG. 20 illustrates a closer view of the toggle cogs and their engagement with the nominal speed rotor when biased in one direction, and their engagement with the increased speed rotor when biased in the opposite direction.

FIG. 18 illustrates a close up view of the proximal end 1722 of one of the bat support arms 1712. FIG. 19 illustrates a side view of the center shaft 1702, the nominal and increased speed rotors 1740, 1742 and four bat tube support arms 1712 with their associated toggle cogs 1790. FIG. 20 illustrates a closer view of the toggle cogs 1790 and their engagement with the nominal speed rotor 1740 when biased in one direction, and their engagement with the increased speed rotor 1742 when biased in the opposite direction.

Each of the plurality of bat assemblies 1710 includes a toggle cog 1790 coupled to the bat tube support arm 1712. The toggle cog 1790 includes a nominal speed side 1792 and an increased speed side 1794. The toggle cog 1790 can be attached to one or both of the right and left bat tube support arms 1712 of the associated bat assembly 1710. The toggle cog 1790 is configured to toggle between two positions: a first position and a second position. In the first position, the nominal speed side 1792 engages the nominal speed rotor 1740, and the increased speed side 1794 is separated from the increased speed rotor 1742. In the second position, the nominal speed side 1792 is separated from the nominal speed rotor 1740, and the increased speed side 1794 engages the increased speed rotor 1742.

The toggle cog 1790 can be as an alternative cog for embodiments described above, but two rotors (nominal and increased speed) are used instead of the increased speed disc 422 and the stationary control surface 520. When the associated bat assembly 1710 enters the functional area 340, the toggle cog 1790 switches to the first position, where the nominal speed side 1792 engages the nominal speed rotor 1740 so the toggle cog 1790 and the associated support arm 1712 and bat assembly 1710 rotate through the functional area 340 at the nominal speed of the nominal speed rotor 1740. When the associated bat assembly 1710 enters the non-functional area 342, the toggle cog 1790 switches to the second position, where the increased speed side 1794 engages the increased speed rotor 1742 so the toggle cog 1790 and the associated support arm 1712 and bat assembly 1710 rotate through the non-functional area 342 at the higher speed of the increased speed rotor 1742.

Figure 21:
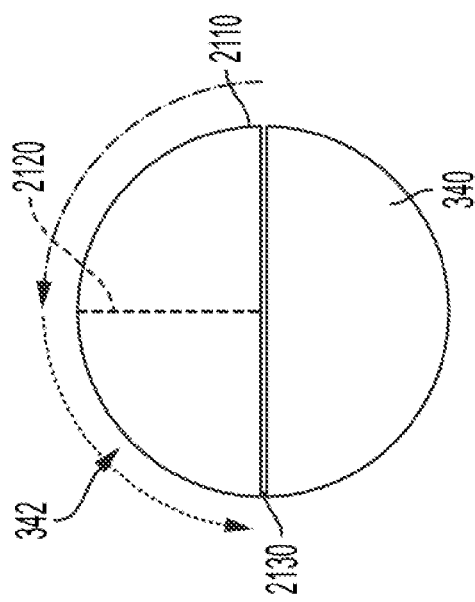
FIG. 21 illustrates an exemplary pickup reel embodiment where each bat assembly first accelerates and then decelerates in the non-functional area.
Figure 22:
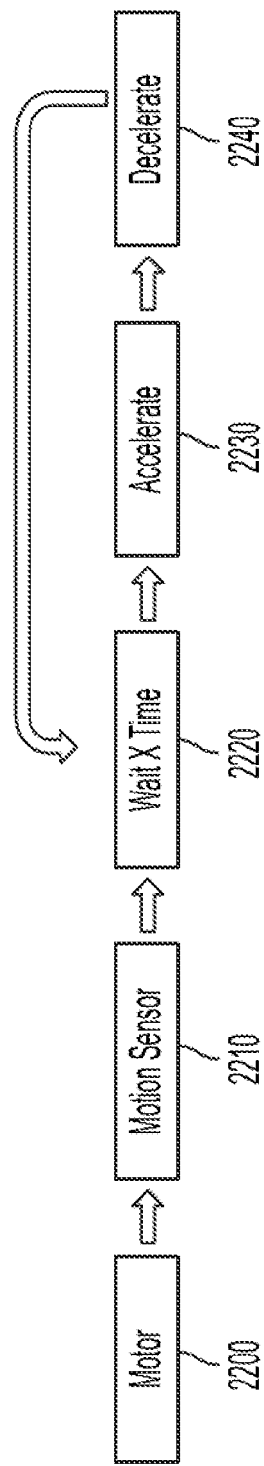
FIG. 22 illustrates a process using a sensor that senses when the bat assembly reaches particular locations in its rotation through the functional and non-functional areas.

FIGS. 21 and 22 illustrate a two motor concept where a first motor rotates at nominal speed and a second motor rotates at a variable speed which is at or above the nominal speed of the first motor. The second motor can function as both an acceleration mechanism to increase the speed of bat assemblies as they enter the non-functional area, and a deceleration mechanism to decrease the speed of bat assemblies as they exit the non-functional area. The pickup reel assembly can be like the pickup reel assembly 700 described above with the cog 900. FIG. 21 illustrates a rotation cycle where the functional area 340 is in the bottom half and the non-functional area 342 is in the top half of the cycle. As a bat assembly 710 enters the non-functional area 342 at location 2110, the cog 900 engages the acceleration mechanism and the bat assembly 710 accelerates with the second motor from nominal speed at location 2110 to a maximum speed at location 2120. The cog stays engaged with the bat assembly 710, and starting at location 2120 the cog 900 engages the deceleration mechanism and the bat assembly 710 decelerates with the second motor from the maximum speed to close to nominal speed at location 2130. At location 2130, the bat assembly 710 enters the functional area 340 and the cog 900 disengages the second motor and engages the first motor so the bat assembly 710 rotates through the functional area 340 at the nominal speed. The second motor can accelerate the cog 900 and bat assembly 710 to a maximum speed of several times nominal speed, for example four times nominal speed. It is desirable for the acceleration and deceleration of the bat assemblies 710 and the transitions to/from nominal speed to not apply excessive forces on the bat assemblies 710 or the pickup reel assembly 700. The two motors can include a primary motor that drives the entire pickup reel assembly, and a smaller motor that provides the acceleration and deceleration in the non-functional area 342.

This process can be software controlled as shown in FIG. 22 using a sensor that senses when the bat assembly 710 reaches particular locations in the rotation shown in FIG. 21. At block 2200, the motors are activated to rotate the pickup reel assembly 700. At block 2210, the sensor determines the location of a bat assembly 710. At block 2220, a delay time can be implemented for the bat assembly 710 to continue to rotate at constant velocity, for example as it rotates through the functional area 340 at nominal speed. At block 2230, the acceleration mechanism starts to accelerate the bat assembly 710, for example at location 2110 when entering the non-functional area 342. At block 2240, the deceleration mechanism starts to decelerate the bat assembly 710, for example at location 2120 to slow the bat assembly 710 back down towards nominal speed before entering the functional area 340.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A pickup reel assembly configured to move crop material into a harvester, the pickup reel assembly comprising:
    a hub configured to rotate about a rotational axis;
    a plurality of bat assemblies, where each of the plurality of bat assemblies includes left and right bat tube support arms and a bat tube, where a proximal end of each of the left and right bat tube support arms is coupled to the hub and a distal end of each of the left and right bat tube support arms is coupled to opposite ends of the bat tube;
    wherein each bat assembly of the plurality of bat assemblies is configured to rotate through a functional area where the bat assembly is positioned to move crop material into the harvester and a non-functional area where the bat assembly is not positioned to move crop material into the harvester; and
    wherein each bat assembly of the plurality of bat assemblies is configured to rotate at a first speed through the functional area and to rotate at a second speed through the non-functional area, where the second speed is greater than the first speed.

2. The pickup reel assembly of claim 1, further comprising:
a nominal speed shaft configured to rotate about the rotational axis at the first speed; and
an increased speed shaft configured to rotate about the rotational axis at the second speed;
wherein when a bat assembly of the plurality of bat assemblies rotates through the non-functional area, the pickup reel assembly is configured to couple the bat assembly to the increased speed shaft; and
wherein when the bat assembly rotates through the functional area, the pickup reel assembly is configured to decouple the bat assembly from the increased speed shaft.

3. The pickup reel assembly of claim 2, further comprising a plurality of fingers configured to move crop material into the harvester; wherein each bat assembly of the plurality of bat assemblies includes a finger of the plurality of fingers attached to the bat tube of the bat assembly.

4. The pickup reel assembly of claim 2, further comprising:
a guide ring fixedly coupled to the hub; and
a support ring where the proximal end of each of the plurality of bat assemblies is coupled to the guide ring, and the distal end of each of the plurality of bat assemblies is coupled to the support ring;
wherein the proximal end of each of the plurality of bat assemblies is movable along the guide ring, and the distal end of each of the plurality of bat assemblies is movable along the support ring.

5. The pickup reel assembly of claim 4, wherein each bat tube support arm of the plurality of bat tube support arms further comprises a retention mechanism that is configured to hold the bat tube support arm in the guide ring while allowing the proximal end of each of the plurality of bat tube support arms to move along the guide ring.

6. The pickup reel assembly of claim 4, further comprising a plurality of cogs, where each cog of the plurality of cogs is associated with a bat assembly of the plurality of bat assemblies;
wherein when the associated bat assembly rotates through the non-functional area, the associated cog is configured to couple to the increased speed shaft and rotate the associated bat assembly through the non-functional area at the second speed; and
wherein when the associated bat assembly rotates through the functional area, the associated cog is configured to decouple from the increased speed shaft and rotate the associated bat assembly through the functional area at the first speed.

7. The pickup reel assembly of claim 6, wherein each of the plurality of cogs comprises a control arm, and the guide ring includes a plurality of slots;
wherein when the associated bat assembly rotates through the functional area, the control arm of the associated cog is configured to engage in a guide ring slot of the plurality of slots and couple the associated cog to the nominal speed shaft; and
wherein when the associated bat assembly rotates through the non-functional area, the control arm of the associated cog is configured to disengage the associated cog from the guide ring and allow the associated bat assembly to engage the increased speed shaft.

8. The pickup reel assembly of claim 7, wherein each of the plurality of cogs further comprises an engagement face;
wherein when the associated bat assembly rotates through the functional area, the engagement face of the associated cog is configured to decouple the associated cog from the increased speed shaft; and
wherein when the associated bat assembly rotates through the non-functional area, the engagement face of the associated cog is configured to couple the associated cog with the increased speed shaft.

9. The pickup reel assembly of claim 8, wherein each cog of the plurality of cogs further comprises an internal spring that pushes the cog laterally;
wherein when the associated bat assembly rotates through the functional area, the internal spring is configured to push the control arm of the associated cog to engage in a guide ring slot of the plurality of slots and couple the associated cog to the nominal speed shaft; and
wherein when the associated bat assembly rotates through the non-functional area, the engagement face is configured to compress the internal spring of the associated cog and disengage the control arm from the guide ring and allow the associated bat assembly to engage the increased speed shaft.

10. The pickup reel assembly of claim 6, further comprising,
an increased speed disc attached to the increased speed shaft, the increased speed disc configured to rotate about the rotational axis at the second speed; and
a stationary control surface;
wherein each of the plurality of cogs further comprises a first engagement face that faces the stationary control surface and a second engagement face that faces the increased speed disc;
wherein when the associated bat assembly rotates through the non-functional area, the stationary control surface is configured to engage the first engagement face of the associated cog and press the second engagement face of the associated cog against the increased speed disc through the non-functional area; and
wherein when the associated bat assembly rotates through the functional area, the stationary control surface is configured to not engage the first engagement face of the associated cog and allow the second engagement face of the associated cog to separate from the increased speed disc through the functional area.

11. The pickup reel assembly of claim 10, wherein each of the plurality of cogs comprises a control arm, and the guide ring includes a plurality of slots;
wherein when the associated bat assembly rotates through the functional area, the control arm of the associated cog is configured to engage in a guide ring slot of the plurality of slots and couple the associated cog to the nominal speed shaft; and
wherein when the associated bat assembly rotates through the non-functional area, the control arm of the associated cog is configured to disengage the associated cog from the guide ring and allow the associated bat assembly to engage the increased speed disc.

12. The pickup reel assembly of claim 11, wherein each cog of the plurality of cogs further comprises an internal spring that pushes the cog laterally, and
wherein when the associated bat assembly rotates through the functional area, the internal spring is configured to push the control arm of the associated cog to engage in the guide ring slot and couple the associated cog to the nominal speed shaft through the functional area; and
wherein when the associated bat assembly rotates through the non-functional area, the stationary control surface is configured to compress the internal spring and disengage the control arm of the associated cog from the guide ring and allow the associated bat assembly to engage the increased speed disc through the non-functional area.

13. The pickup reel assembly of claim 12, wherein the first engagement face of each of the plurality of cogs includes a plurality of pins configured to rotate; and when the associated bat assembly rotates through the non-functional area, the plurality of pins on the first engagement face of the associated cog rotate on the stationary control surface.

14. The pickup reel assembly of claim 12, wherein the stationary control surface includes a leading member that includes a plurality of rollers;
   wherein when the associated bat assembly first engages the stationary control surface the plurality of rollers of the leading member accelerate the cog of the associated bat assembly from the first speed to an accelerated speed greater than the first speed and less than the second speed.

15. The pickup reel assembly of claim 6, further comprising,
   an increased speed disc attached to the increased speed shaft, the increased speed disc configured to rotate about the rotational axis at the second speed;
   wherein when the associated bat assembly rotates through the non-functional area, the associated cog is configured to engage the increased speed disc to rotate the associated bat assembly through the non-functional area at the second speed.

16. The pickup reel assembly of claim 15, further comprising,
   a nominal speed disc attached to the nominal speed shaft, the nominal speed disc configured to rotate about the rotational axis at the first speed;
   wherein when the associated bat assembly rotates through the functional area, the associated cog is configured to engage the nominal speed disc to rotate the associated bat assembly through the functional area at the first speed.

17. The pickup reel assembly of claim 16, wherein each of the plurality of cogs is a toggle cog configured to toggle between a first position and a second position, and
   when the associated bat assembly enters the functional area, the toggle cog toggles to the first position to engage the nominal speed disc; and
   when the associated bat assembly enters the non-functional area, the toggle cog toggles to the second position to engage the increased speed disc.

18. The pickup reel assembly of claim 17, wherein each of the plurality of cogs is attached to one of the left and right bat tube support arms of the associated bat assembly, and the one of the left and right bat tube support arms is positioned between the nominal speed disc and the increased speed disc, and
   when the associated bat assembly enters the functional area, the toggle cog toggles in a first direction to engage the nominal speed disc and release the increased speed disc; and
   when the associated bat assembly enters the non-functional area, the toggle cog toggles in a second direction to engage the increased speed disc and release the nominal speed disc, where the second direction is opposite to the first direction.

19. The pickup reel assembly of claim 6, further comprising an increased speed disc attached to the increased speed shaft, the increased speed disc configured to rotate about the rotational axis at the second speed;
   wherein each of the plurality of cogs comprises an engagement surface,
   wherein when the associated bat assembly rotates through the non-functional area, the engagement surface of the associated cog is moved inward to couple the associated cog to the increased speed shaft through the non-functional area; and
   wherein when the associated bat assembly rotates through the functional area, the engagement surface of the associated cog is moved outward to decouple the associated cog from the increased speed shaft through the functional area.

20. The pickup reel assembly of claim 19, further comprising a guide surface;
   wherein each of the plurality of cogs comprises a guide connector,
   wherein the guide connector of each of the plurality of cogs follows the guide surface to move the engagement surface of the associated cog inward and outward as the associated bat assembly rotates through the functional and non-functional areas.

* * * * *